UNITED STATES PATENT OFFICE.

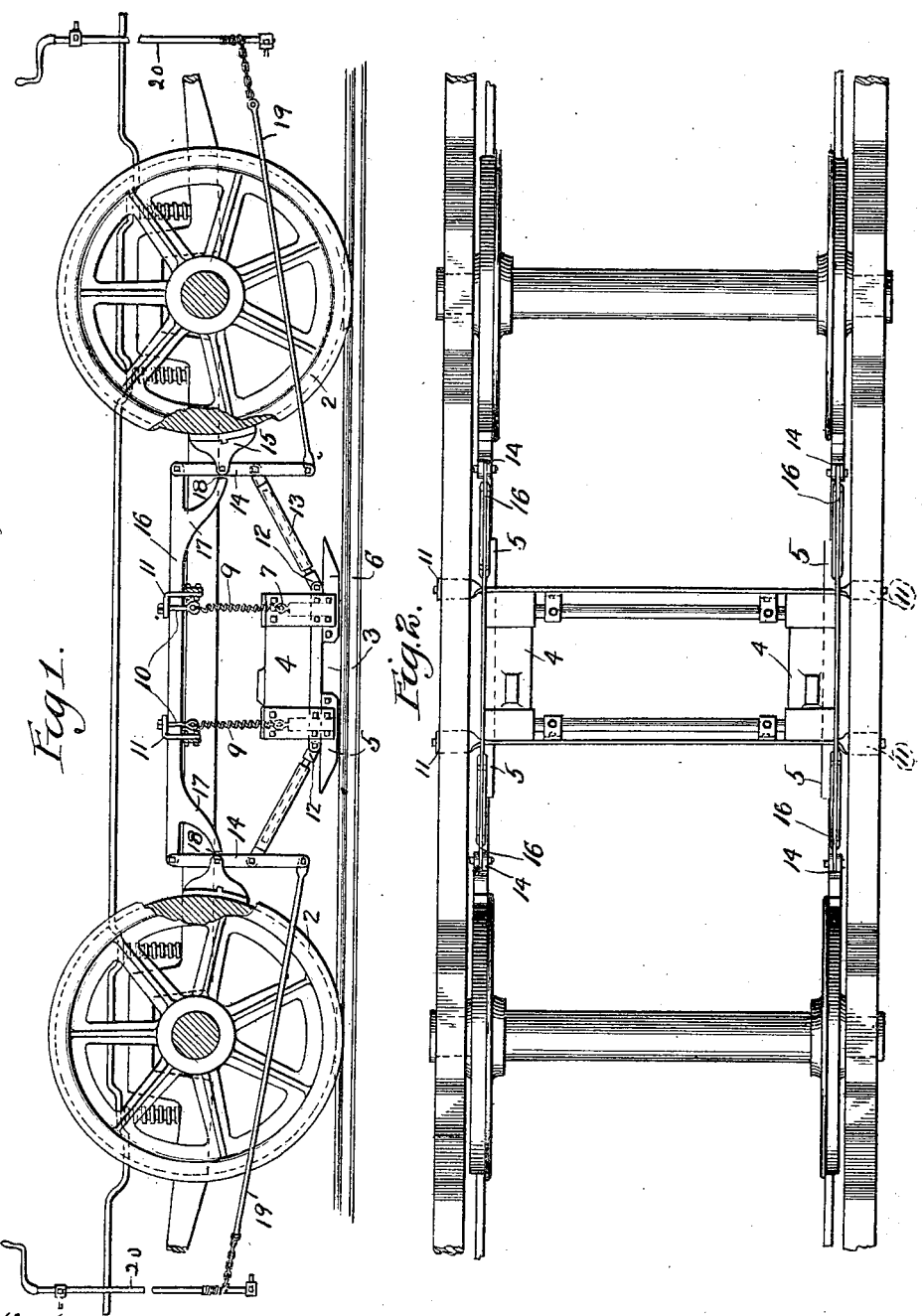

FRANK C. NEWELL, OF CHICAGO, ILLINOIS, ASSIGNOR TO THE WESTINGHOUSE AIR BRAKE COMPANY, OF PITTSBURG, PENNSYLVANIA.

ELECTRIC BRAKE MECHANISM.

SPECIFICATION forming part of Letters Patent No. 667,729, dated February 12, 1901.

Application filed August 26, 1899. Serial No. 728,610. (No model.)

*To all whom it may concern:*

Be it known that I, FRANK C. NEWELL, a citizen of the United States, residing in Chicago, Cook county, Illinois, have invented a certain new and useful Improvement in Electric Brake Mechanism, of which the following, taken in connection with the accompanying drawings, is a specification.

My invention relates to electric brake devices which employ one or more wheel-brakes operated magnetically.

When a car-wheel is rendered magnetic by any means, it tends to attract and pick up all the small particles of iron or steel near the rails. I have found in practice that when in the operation of an electric brake a magnetized wheel-shoe is applied to a car-wheel the wheel may become magnetized sufficiently to attract and accumulate such a quantity of particles of iron and steel as to produce a very objectionable action of the electric current when the motor-current is turned on to propel the car. I find that the small particles which collect upon the tread of the wheel interfere with the contact between the wheel and the rail and cause such an amount of sparking as to melt or fuse the iron particles to the wheel. In order to overcome this difficulty, I provide means for magnetically insulating the wheels or shoes from the magnetized parts of the brake apparatus, and in the construction shown I provide a brass thrust-rod connection in place of an iron one, such as has been heretofore employed.

The first of the objects of my present invention, therefore, may be said to be the magnetic insulation or isolation of the wheel or its shoe from the magnetized parts of the brake apparatus for the purpose of preventing the difficulty described and also the combination, with a magnetic rail-shoe, of a wheel-shoe, connections between them whereby the rail-shoe when applied will set the wheel-shoe through the inertia of the car, and means whereby the wheel-shoe is protected from or kept out of the magnetic circuit formed between the rail-shoe and the rails. As a preferred means for accomplishing this object, as stated, I construct the connections between the magnetic rail-shoe and the wheel-shoe partly of a metal which will not be subject to the action of the magnet, brass being perhaps the most suitable.

Another of the objects of my present invention is the provision of an improved method of suspending the rail-shoe whereby greater freedom of movement of the same over uneven places in the track, such as frogs and switches, and greater lateral movement in passing around sharp curves is obtained.

Another object of my invention is the simplification and improvement of the lever and thrust-rod connections between the rail-shoe and the wheel-shoes and between the wheel-shoes themselves.

A further object of my invention relates to the provision of a rod connection between the brake-shoe levers formed with projections at each of its ends, whereby the strain thereof is transmitted directly to another wheel-shoe, which thus forms the point of ultimate resistance, and no rigid bracket-iron attached to the truck is required.

The above, as well as such other objects as may hereinafter appear, I attain by means of a construction which I have illustrated in preferred form in the accompanying drawings, in which—

Figure 1 shows a vertical section through a car-truck to which my improved brake mechanism has been applied, and Fig. 2 shows a plan view of the same.

Adjacent to the rail 1 and suspended between the wheels 2 I provide a rail-shoe 3, operating magnetically, the coil of the magnet being within the part marked 4, and the poles 5 and 6 at the opposite ends of the coil projecting downwardly toward the rail, which forms the keeper for the magnet when the brake is set. At 7 and 8 I provide a couple of eyes or fastening-lugs, in which are secured some tension suspension-springs 9 9, the upper ends of which are supported by adjustable eyes 10, carried in fixed brackets 11, secured to the truck. To each end of the rail-shoe 3 I connect an extensible or telescopic thrust-rod composed of two parts 12 and 13, the outer end of the part 13 bearing against the lever 14, which presses the shoe 15 against the wheel.

Between the upper ends of the levers 14 I have provided a connecting-rod 16, having at each of its ends a downwardly-projecting extension or arm 17, formed rigid with the rod and adapted to transmit the strain of the rod in either direction against the center of the brake-shoe. Thus if the car be moving toward the left and the brake be applied the rail-shoe 3, being drawn down upon the rail, will react, because of the inertia of the car upon the lever 14, to press the shoe 15 against its wheel, and the rod 16 will transmit the strain of the upper end of the lever 14, through the projection 17, against the wheel-shoe at 18, the point of ultimate resistance being thus brought squarely against the other brake-shoe and any necessity for fixed or what is known as "dead" lever-supports or connections being avoided.

The part 13 of the thrust-rod connection between the rail-shoe and the wheel-shoe is made tubular or hollow, and the part 12 enters therein in the manner shown by the dotted lines. One or the other, or both, of these parts, preferably the tubular part, I make of brass or some other non-magnetic metal, in order that when the current is turned on the magnet 4, the shoes 15, and the wheels will not form a part of the magnetic circuit with the rail. It is probable that the use of a lever 14, made of brass, or a shoe-head of the same metal, would accomplish the same results, and such constructions I desire to be understood as equivalents and clearly within the scope of my present invention.

The levers 14 are extended downwardly and connected by rods 19 with hand-brake shafts 20 at both ends of the car, whereby is provided a convenient means for manually operating both wheel-shoes from either end of the car without interference with the power actuation of the brake, and whereby also, if desired, the pressure on the wheel-shoe when the brake is set may be manually increased.

By the arrangement of the springs 9 and the employment of a tension-spring alone instead of the compression-spring with a hanger-rod, which I have shown in a prior patent, (reissue No. 11,786, issued November 7, 1899, original No. 616,956,) I not only simplify the construction, but I am enabled to get a much greater freedom of motion of the rail-shoe 3, and hence a much more satisfactory operation of the brake than is possible with such prior construction. The telescopic thrust-rod between the rail-shoe and the wheel-shoe affords a sufficient guide or staying support to keep the rail-shoe in proper position, while the rail-shoe is at the same time capable of the utmost freedom of motion vertically, transversely, and longitudinally to the limit of the movement permitted by the thrust-rod connections. Thus, for example, in going around a curve, even if the rail-shoe hangs several inches to one side of the rail, the moment current is applied it will jump over and engage the rail without any interference from its supporting devices.

Having thus described my invention, what I claim as new, and desire to secure by Letters Patent, is—

1. In an electric brake apparatus, a magnetic rail-shoe, a wheel-shoe and connections whereby the wheel-shoe is applied by the longitudinal movement of the rail-shoe, part of said connections being formed of non-magnetic material.

2. In an electric brake apparatus, a magnetic rail-shoe, wheel-shoes adapted to be applied by the longitudinal movement of the rail-shoe and connections of non-magnetic material between the rail-shoe and the wheel-shoes.

3. In an electric brake apparatus, a magnetic rail-shoe suspended by a yielding connection and adapted to move freely in a transverse direction, and a wheel-shoe adapted to be operated by the movement of the rail-shoe.

4. In an electric brake apparatus, a magnetic rail-shoe suspended directly by a tension-spring and adapted to move freely in a direction transverse to the track.

5. In an electric brake apparatus, a magnetic rail-shoe suspended by tension-springs and adapted to move freely transversely to the track, and a wheel-shoe adapted to be operated by the movement of the rail-shoe.

6. In an electric brake apparatus, a magnetic rail-shoe suspended by springs and being free to move in a transverse direction, a wheel-shoe and means to operate the wheel-shoe by the movement of the rail-shoe.

7. In an electric brake apparatus, a magnetic rail-shoe suspended by springs and being free to move in a transverse direction, a wheel-shoe and an extensible thrust-rod connection between the rail-shoe and the wheel-shoe.

8. In a car-brake apparatus, the combination, with a rail-shoe and two wheel-shoes adapted to be operated by the movement of the rail-shoe, of means for manually operating both wheel-shoes from either end of the car independently of the movement of the rail-shoe.

9. In a car-brake apparatus, the combination, with a rail-shoe and two wheel-shoes adapted to be operated by the movement of the rail-shoe, of manually-operated means for increasing the pressure of the wheel-shoes on the wheels.

10. In a car-brake apparatus, two wheel-shoes, levers for the wheel-shoes, a connection between the levers, means for operating either of the levers by hand and a connection for transmitting pressure from one lever directly to the other wheel-shoe.

11. In a car-brake apparatus, the combination, of a rail-shoe, two wheel-shoes, lever connections by which either wheel-shoe may be operated by the rail-shoe, and a connection for transmitting pressure from one lever directly to the other wheel-shoe.

12. A brake having a rail-shoe, a wheel-shoe at each end of said rail-shoe, a lever upon each wheel-shoe, a connecting-rod between said levers for transmitting the braking force from one of said wheel-shoes to the other, and connections between said rail-shoe and said levers whereby the application of the rail-shoe actuates the levers to set the wheel-shoes, and projections at each end of said connecting-rod whereby the strain thereof is transmitted directly to the other wheel-shoe.

FRANK C. NEWELL.

Witnesses:
PAUL CARPENTER,
PAUL SYNNESTVEDT.